2,795,432
				Patented June 11, 1957

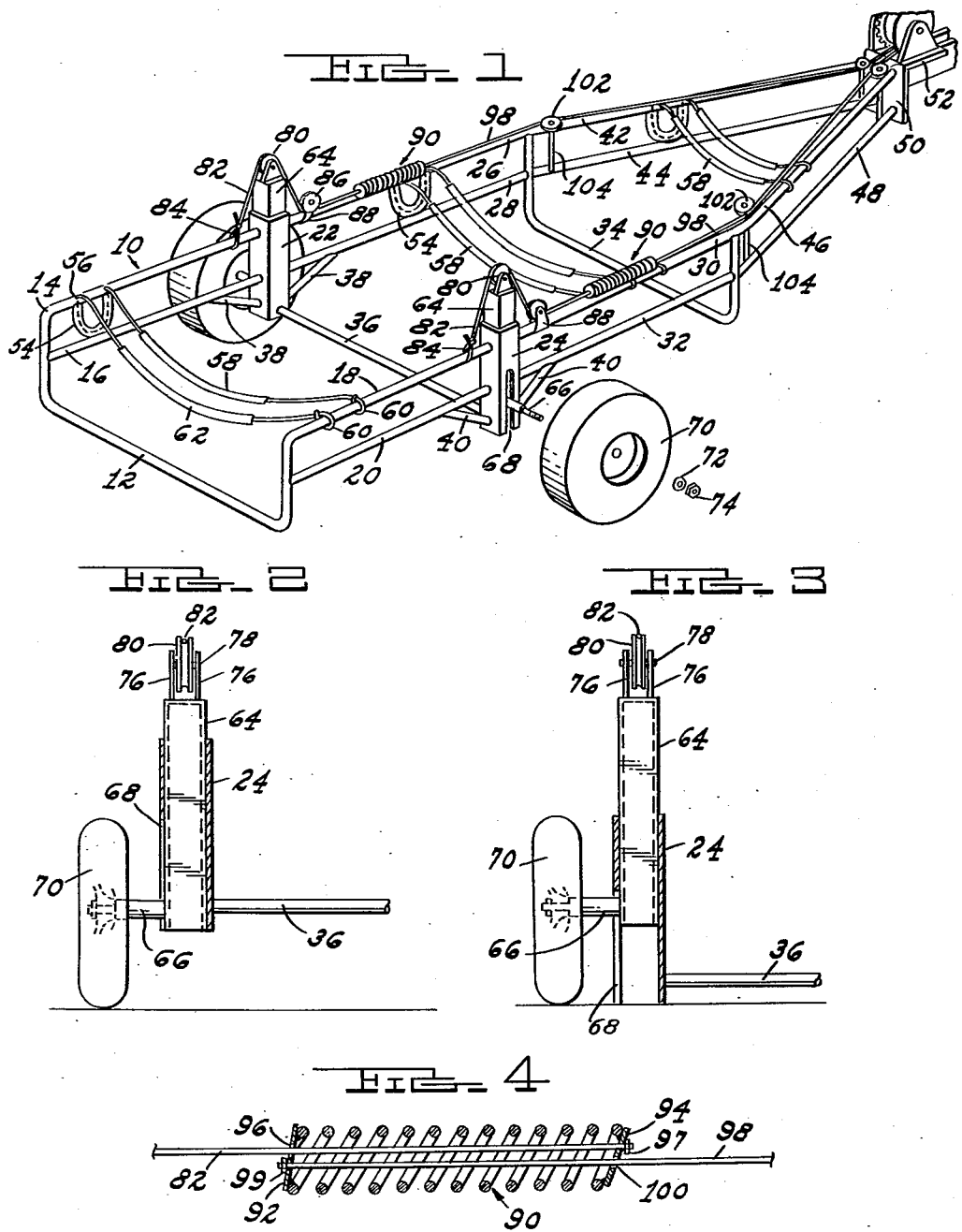

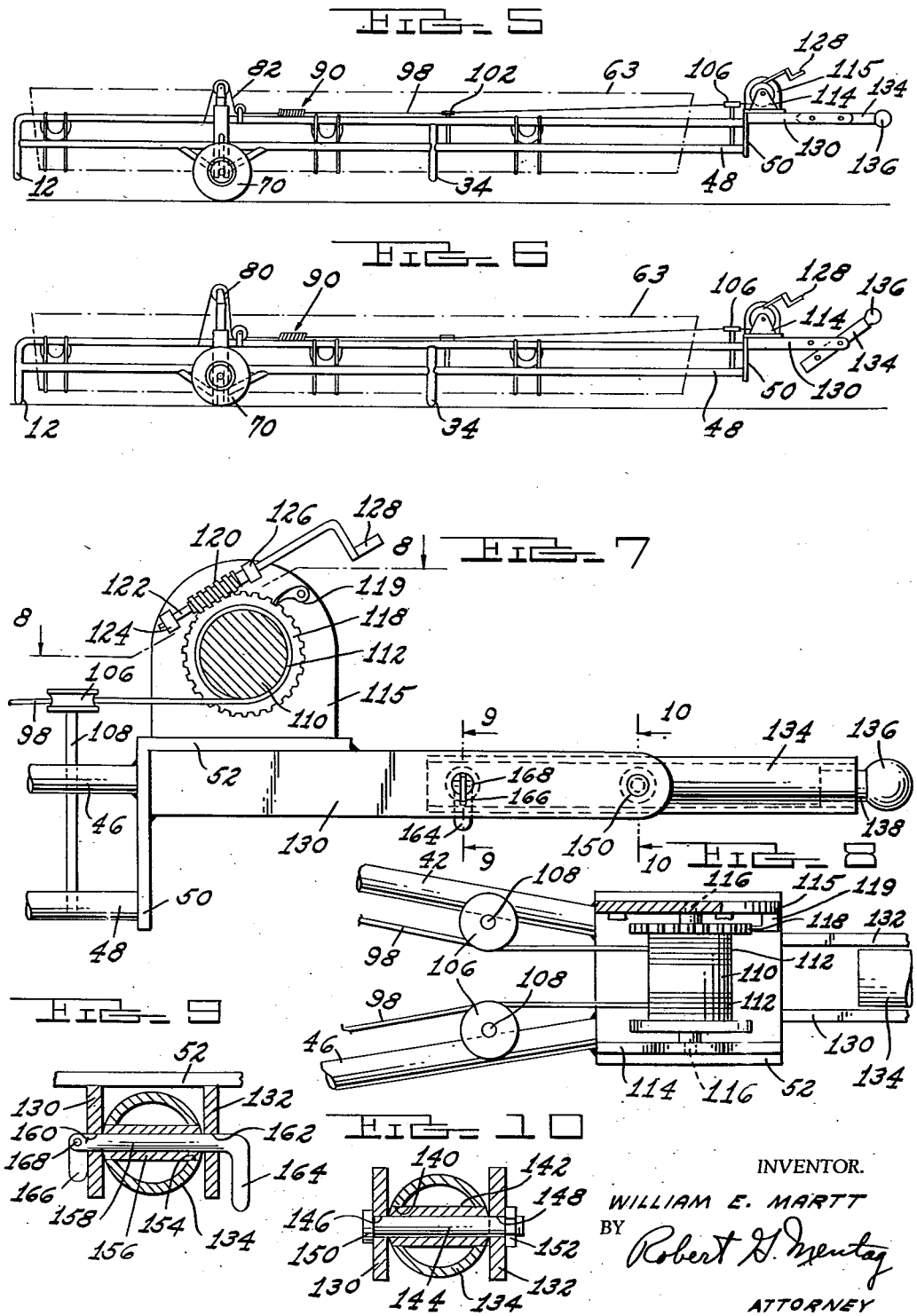

2,795,432
BOAT TRAILER AND MECHANISM FOR RAISING AND LOWERING THE FRAME THEREOF

William E. Martt, Highland Park, Mich.

Application July 24, 1956, Serial No. 599,836

1 Claim. (Cl. 280—44)

This invention relates to a novel trailer and, more particularly, to a novel and improved boat trailer which is provided with a boat supporting frame and a novel and improved means for selectively raising and lowering the frame, whereby a boat may be hauled or removed from the water in an easy and convenient manner.

When using the prior art type of boat trailers to launch a boat therefrom, it has been necessary to either unhitch the trailer and push it manually into the water to launch the boat, or to lift the boat from the trailer and manually put it into the water. Both of the aforementioned methods of removing a boat from the prior art type of boat trailers are burdensome and awkward.

Accordingly, it is the primary object of this invention to provide a boat trailer from which a boat may be easily and quickly launched into the water and onto which the boat may be quickly and easily removed from the water, without detaching the trailer from the vehicle to which it is attached for pulling.

Another object of this invention is to provide a boat trailer which includes a boat supporting frame which is slidably mounted on a pair of vertically disposed support members, whereby the frame may be raised or lowered to facilitate removing or loading of the boat on said frame.

It is another object of this invention to provide a boat trailer including a boat supporting frame and novel and improved frame lifting means which are easily and quickly manipulated in a convenient manner to put the frame to any desired height relative to the ground.

It is a still further object of this invention to provide a boat trailer of the class described which is simple and practical in construction, strong and reliable in use, attractive in appearance, economical of manufacture and otherwise adapted for the purposes for which the same is intended.

Other objects, features and advantages of this invention will be apparent from the following detailed description and appended claim, reference being had to the accompanying drawings forming a part of the specification wherein like reference numerals designate corresponding parts of the several views.

In the drawings:

Fig. 1 is a perspective view of an illustrative embodiment made in accordance with the principles of the invention and with parts removed to show their relationship;

Fig. 2 is a partial elevational sectional view of the structure illustrated in Fig. 5, showing the boat frame in a raised position;

Fig. 3 is a partial elevational sectional view of the structure illustrated in Fig. 6, showing the boat frame in the lowered position;

Fig. 4 is an elevational sectional view of one of the shock absorbing springs employed in the invention;

Fig. 5 is a side elevational view of the structure shown in Fig. 1, and showing the boat frame in a raised position;

Fig. 6 is a view similar to Fig. 5, and showing the boat trailer frame in a lowered position;

Fig. 7 is an enlarged fragmentary elevational view, partly in section, of the draw bar mounted on the front end of the trailer;

Fig. 8 is a fragmentary top plan view of the structure illustrated in Fig. 7, taken along the line 8—8 thereof;

Fig. 9 is an enlarged fragmentary elevational sectional view of the structure shown in Fig. 7, taken along the line 9—9 thereof; and Fig. 10 is an enlarged elevational sectional view of the structure shown in Fig. 7, taken along the line 10—10 thereof.

Referring now to the drawing, and in particular to Fig. 1, wherein is shown an illustrative embodiment, the numeral 10 designates generally the boat supporting frame of the invention. The frame 10 includes the rear U-shaped cross rail 12 which is disposed with the bight portion thereof downwardly, so as to rest on the ground when the frame is in the lowered position. The U-shaped portion 12 as well as all the other parts of the frame 10 are preferably made from one-inch pipe members or the like. Fixedly mounted to the member 12, as by welding, are the forwardly extending longitudinal parallel spaced apart rails 14 and 16 on the left side of the frame, as viewed in Fig. 1. Fixedly mounted to the right end of the member 12 are the spaced apart forwardly extended longitudinal rails 18 and 20. Fixedly mounted to the front end of the rails 14 and 16, as by welding, is a vertically disposed elongated tubular member 22 which is preferably square in cross section. Fixedly mounted to the forward end of the rails 18 and 20, as by welding, is a second vertically disposed elongated tubular member 24. Extending forwardly from the vertical tubular member 22 and fixedly mounted thereto, as by welding, are the longitudinally extending vertically spaced apart rails 26 and 28. A similar pair of longitudinal spaced apart rails 30 and 32 are fixedly mounted to the forward side of the vertical tubular member 24. Fixedly mounted on the forward ends of the side rails 26, 28 and 30 and 32 is the front U-shaped cross rail 34 which is disposed with the bight portion thereof downwardly so as to rest on the ground when the frame 10 is in the lowered position. The vertical tubular members 22 and 24 are interconnected on the lower ends thereof by means of the cross bar 36. The vertical tubular members 22 and 24 are secured further to the frame 10 by means of the diagonally disposed reinforcing struts 38 and 40, respectively, which are connected to the lower rail on each side of the frame 10.

Extending forwardly from the front U-shaped cross rail 34 and having fixedly mounted thereto, as by welding, are the forwardly and inwardly extending rails 42 and 44 which are vertically spaced apart from each other. A similar pair of rails 46 and 48 are fixedly mounted on the right side of the cross rail 34 and extend forward and inward and are vertically spaced apart from each other. As best seen in Figs. 1 and 7, the forward ends of the rails 42, 44, 46 and 48 are fixedly secured to the vertical plate 50, in any suitable manner, as by welding. Integral with the upper end of the plate 50 is the forwardly extending horizontal plate 52.

A plurality of downwardly extending U-shaped pipes or conduits, as 54, are mounted in a spaced apart manner along the left side of the frame 10 and depend downwardly from the upper rails 14, 26 and 42 to which they are fixedly mounted. The rails 14, 26 and 42 are provided with apertures therethrough, as 56, which are adapted to communicate with the insides of the U-shaped pipes 54. A boat supporting cable 58 is adapted to be passed through each of the U-shaped pipes 54, by means of the apertures 56, and the ends of the cables 58 are adapted to be secured to the right side of the frame, as at the points designated 60, around the upper rails 18, 30 and 46, by any suitable means, as by cable clamps. The cables 58 are adapted to loop downwardly and are suitably covered with a flexible resilient material, as a rubber hose or tubing, generally indicated by the numeral 62, so as to prevent chafing of the under side of the boat when it rests on the cables. As shown in Figs. 5 and 6, the boat 63, indicated by the dotted lines, would rest on the cables 58 and may be additionally secured to the frame by any suitable means, not shown.

Telescopically mounted in each of the tubular members 22 and 24 is a vertical support member, as 64, which is preferably square in cross section and tubular, as best seen in Figs. 1 through 3. The support member 64 is longer than the members 22 and 24 and extends thereabove in the normal raised position, as illustrated in Fig. 2. Each of the support members 64 is provided with a wheel axle, as 66, on the lower outer side thereof which extends outwardly through the vertical slot 68 in the side of the tubular members 22 and 24. Suitably rotatably mounted on the outer end of each of the axles 66 is a wheel 70 which is secured on the shaft, as by means of the washer 72, and nut 74.

The upper end of each of the support members 64 is enclosed and has fixedly mounted thereon, as by welding, the laterally spaced apart upwardly extending brackets 76, between which is rotatably carried the shaft 78 on which is fixed the vertically disposed pulley or cable guide means 80.

Operatively mounted on each side of the frame 10 is the cable means which generally cooperates with the support members 64 for raising or lowering the frame 10 and, since the cable means on each side is constructed in the same manner, similar numerals are used to designate similar parts on each side of the frame 10. The aforementioned cable means includes a first cable 82 having the rear end thereof fixedly mounted to the upper rail of the frame rearwardly of the vertical tubular members 22 and 24, as to the rails 14 and 18, as indicated by the numeral 84. The cables 82 pass forwardly and upwardly and over the pulleys 80 and then downwardly and forwardly and under the vertically disposed pulleys 86 which are suitably rotatably secured to the frame by means of the brackets 88. The forward ends of the cables 82 are then suitably secured, as more fully described hereinafter, to the shock absorbing means or spring, generally designated by the numeral 90.

As illustrated in Fig. 4, the shock absorbing means or spring 90 are of the coiled type and have fixedly attached to each end, as by welding, the end plates 92 and 94. The rear end of the cable 82 is adapted to pass through the aperture 96 in the rear end plate 92 and to extend through the spring 90 and through the front plate 94. The extreme end of the cable 82 is provided with any suitable means, as a clamp or abutment means 97 on the end thereof, which is adapted to abut the front side of the front plate 94. The aforementioned cable means further includes the second cable 98, the rear end of which extends through the aperture 100 in the front spring end plate 94 and through the spring 90 and through a suitable aperture in the rear end plate 92. The rear end of the cable 98 is provided with any suitable abutment means, as a cable clamp generally indicated by the numeral 99, which is adapted to abut the rear face of the rear end plate 92. It will be seen that, as tension is provided on the cables 82 and 98, the spring 90 will be compressed, since the abutment means 97 and 99 abut the outer faces of the spring and plates and the pressure on the spring is applied on the ends thereof, whereby the spring is put under compression.

As shown in Fig. 1, the cable 98 on the left side of the trailer, as viewed from the left end thereof, passes forwardly along the upper edge of the frame 10 and around the horizontal pulley 102 which is suitably rotatably mounted on the upper end of the vertical shaft 104 which is fixedly mounted to the frame 10 by any suitable means, as by welding. The cable 98 on the right side of the frame 10 passes forwardly along the upper edge thereof and around the horizontally disposed pulley, also marked 102, which is suitably rotatably mounted on a vertical shaft also marked 104, which is suitably fixed to the frame, as by welding.

As best seen in Figs. 1, 7 and 8, the cables 98 pass forwardly from the pulleys 102 along the upper edge of the frame 10 and pass inwardly around the pair of horizontal pulleys marked 106, which are suitably rotatably mounted on the vertical shafts 108 which are suitably fixedly mounted on the frame 10, as by welding. The forward ends of the cables 98 are suitably wound on the winch drum 110 on each side thereof, as indicated by the numerals 112. The winch drum 110 is suitably rotatably mounted between a pair of laterally disposed upwardly extending brackets 114 and 115, as indicated by the numerals 116. The brackets 114 and 115 are fixedly mounted on the upper side of the horizontal plate 52 by any suitable means, as by welding. Fixedly mounted on the left side of the drum 110, as viewed from the rear of the trailer, is a worm wheel 118 which meshably engages with the worm gear 120. The winch drum 110 may be locked in any desired position by means of the pivotally mounted stop finger 119, which is suitably mounted on the inner side of the vertical bracket 115. The worm gear 120 is fixedly mounted on the shaft 122, the lower end of which is rotatably mounted in the knuckle 124 which is suitably fixedly mounted on the inner side of the vertical bracket 115, by any suitable means, as by welding. The upper end of the shaft 122 extends forwardly and upwardly and is suitably journaled in the knuckle 126 which is suitably fixedly mounted on the inner side of the bracket 115, as by welding. Integral with the upper end of the shaft 122 is a crank handle, generally designated by the numeral 128, for manually operating the winch.

As shown in Figs. 5 through 10, the trailer is provided with a forwardly extending draw bar which includes the vertically disposed laterally spaced apart plates 130 and 132 between the forward ends of which is mounted the tubular member 134. Fixedly mounted in the front end of the tubular member 134 is a forwardly extending shaft 138 on the front end of which is fixed the trailer hitch means or ball head 136 which is of the usual type for connection to the usual trailer hitch connection on the back end of a vehicle for pulling a trailer.

As best seen in Figs. 7, 9 and 10, the tubular member or tongue 134 is provided with a centrally disposed horizontal aperture therethrough, as 140, in which is fixedly mounted, as by welding, the cross pipe or tubular member 142 which is adapted to rotatably support therein the horizontal shaft or cross pin 144. The pin 144 is adapted to extend outwardly of the member 134 and pass through the aperture 146 and 148 in the vertical plates 130 and 132, respectively. The one end of the pin 144 is provided with the head 150 and the other end is threaded and provided with the nut 152 for securing the pin in place. If desired, the ends of the pin 144 may be welded to the plates 130 and 132. The rearward end of the member 134 is further provided with a horizontal transverse aperture, as 154, in which is fixedly mounted, as by welding, the cross pipe 156 which forms a bearing for suitably supporting the cross pin 158. The pin 158 is adapted to pass through the apertures 160 and 162 in the side plates 130 and 132. The pin 158 is provided with an L-shaped head 164 on one end thereof and on the other end thereof with the pivotally mounted arm 166 which is pivotally mounted, as at 168. It will be seen that, the pin 158 is adapted to be releasably mounted, whereby the end of 134 may be detached from the plates 130 and 132 by swinging the arm 166 in alignment with the pin 158, whereby the pin may be removed from the plates 130 and 132 and the member 134. As shown in Fig. 6, the foregoing action permits the frame 10 to be lowered while the hitch means head 136 is attached to the vehicle for pulling the trailer. As shown, the plates 130 and 132 will pivot relative to the member 134 around the pin 144.

In describing the operation of the illustrative embodiment, it will be assumed that the trailer has a boat, as 63, already mounted thereon, and it is desired to remove the boat from the trailer. In order to remove the boat, the trailer would be backed into the water without detaching the trailer from the vehicle which is pulling it. When the rear portion of the boat is partially immersed, the trailer may be lowered to the position shown in Fig. 6 by rotating the winch crank handle 128 in the counter-clockwise direction, as viewed from the right in Fig. 6, whereby, the winch drum 110 will pay out the cables 98 and the weight of the boat and frame will cause the vertical tubular members 22 and 24 to slide downwardly on the supporting members 64, and the entire frame and boat will be lowered into the water. If the trailer has been backed into the water far enough, the boat 63 will be fully buoyant and the boat will be easily slid rearwardly out of the frame 10. Before the winch crank is rotated to lower the frame, as in the manner aforementioned, the releasable pin 158 will have been removed, and when the frame is lowered, the draw bar member 134 will be pivoted in the manner shown in Fig. 6 relative to the draw bar plates 130 and 132. It will be seen that the novel trailer bar means permits the trailer frame to be raised and lowered without detaching the trailer from the pulling vehicle.

In order to raise the frame 10, the winch crank handle 128 will be rotated in a clockwise direction, as viewed from the right of Fig. 7 and the cable means will operate to lift the frame 10 and the tubular members 22 and 24 on the vertical supporting members 64. In transit, the winch wheel drum may be locked in place by means of the lock finger 119. It will be understood, however, that the natural locking coaction between the worm gear 120 and the worm wheel 118 will be sufficient to retain the frame in any raised position, however, the lock finger 119 is an additional safety locking means. In transit, the shock absorbing means 90 functions to resiliently mount the trailer frame 10 on the support means 64 and to take up any road shocks as the trailer is pulled.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claim.

What I claim is:

A trailer of the class described, comprising: a frame adapted to carry an object; a draw bar fixed to one end of said frame; a vertically disposed elongated tubular member mounted on each side of said frame and being provided with a slot on the lower outer side thereof; a support member slidably mounted in each of said tubular members and being provided with an axle which extends outwardly through the slot in the mating tubular member; a wheel operatively mounted on each of said axles; a pulley rotatably mounted on the upper end of each of said support members; a plurality of pulleys mounted on said frame between said tubular members and said draw bar; a winch carried on said draw bar; a shock absorbing means on each side of said frame; a first pair of supporting cables on said frame adapted to pass over the opposite pulleys on the support members and having one of the ends thereof fixed to the frame and the other ends thereof operatively connected to the opposite shock absorbing means; a second pair of cables adapted to operatively pass over said plurality of pulleys and having one of the ends thereof operatively connected to the opposite shock absorbing means and the other ends thereof wound on said winch, whereby, said tubular members and the frame carried thereon may be lowered and raised relative to said support members, and be carried on said support members in any vertical position relative thereto; said draw bar including a pair of laterally spaced apart arms between which is pivotally mounted a rod carrying a trailer hitch means; and, means for releasably locking said rod to said arms for preventing relative pivotal movement therebetween.

References Cited in the file of this patent

UNITED STATES PATENTS

| | | |
|---|---|---|
| 2,487,701 | Getz | Nov. 8, 1949 |
| 2,577,885 | Gay | Dec. 11, 1951 |